Figure 1:
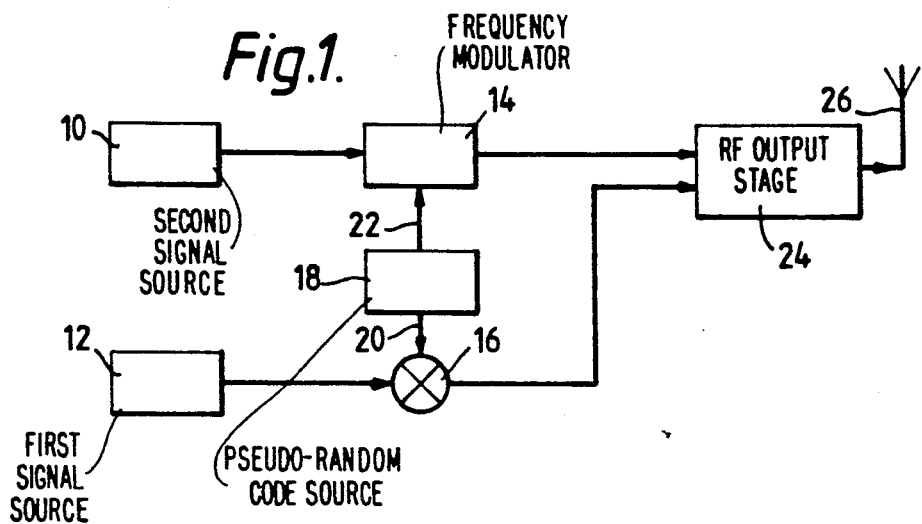

United States Patent [19]

Collier et al.

[11] Patent Number: 5,073,899
[45] Date of Patent: Dec. 17, 1991

[54] TRANSMISSION SYSTEM FOR SENDING TWO SIGNALS SIMULTANEOUSLY ON THE SAME COMMUNICATIONS CHANNEL

[75] Inventors: Christopher J. Collier, Carshalton Beeches; Robert J. Murray, Horley, both of England

[73] Assignee: U.S. Philips Corporation, New York, N.Y.

[21] Appl. No.: 378,886

[22] Filed: Jul. 12, 1989

[30] Foreign Application Priority Data

Jul. 13, 1988 [GB] United Kingdom ............... 8816635

[51] Int. Cl.$^5$ ............................................. H04K 1/00
[52] U.S. Cl. ......................................... 375/1; 380/34; 380/46
[58] Field of Search ..................... 375/1; 380/34, 46

[56] References Cited

U.S. PATENT DOCUMENTS

| | | | |
|---|---|---|---|
| 3,666,889 | 5/1972 | Zegers et al. | 375/1 X |
| 3,912,722 | 3/1990 | Carlin | 375/1 |
| 4,071,692 | 1/1978 | Weir et al. | 375/1 |
| 4,313,197 | 1/1982 | Maxemchuk | 375/1 |
| 4,672,605 | 6/1987 | Hustig et al. | 375/1 X |
| 4,703,474 | 10/1987 | Foschini et al. | 375/1 |
| 4,724,435 | 2/1988 | Moses et al. | 375/1 |
| 4,761,796 | 8/1988 | Dunn et al. | 375/1 |
| 4,835,517 | 5/1980 | van der Gracht et al. | 375/1 |
| 4,866,732 | 9/1989 | Carey et al. | 375/1 |
| 4,941,150 | 7/1990 | Iwasaki | 375/1 |
| 4,943,976 | 7/1990 | Ishigaki | 375/1 |

FOREIGN PATENT DOCUMENTS 1046669 1/1979 Canada .
61-03542 5/1986 Japan .

Primary Examiner—Thomas H. Tarcza
Assistant Examiner—Tod Swann, II
Attorney, Agent, or Firm—David R. Treacy

[57] ABSTRACT

A transmission system in which a suitably modulated speech or data signal is combined with a low bit rate (100b/s) spread spectrum signal and transmitted simultaneously on the same channel with the modulated speech lying within the bandwidth of the spread spectrum signal.

At a receiver the modulated speech or data signal is demodulated and the modulated speech or data signal together with the spread spectrum signal are applied to a multiplier in which the spread spectrum signal is de-spread.

A code synchronizing signal may be included in the modulated signal prior to transmission and when recovered in the receiver, the synchronizing signal is applied to a pseudo-random code generating means. The transmission system may include a text transmission system in which case the low bit rate signal comprises pages of data. A number of pages may be transmitted simultaneously by spreading the data associated with each page by orthogonal psuedo-random codes.

17 Claims, 1 Drawing Sheet

TRANSMISSION SYSTEM FOR SENDING TWO SIGNALS SIMULTANEOUSLY ON THE SAME COMMUNICATIONS CHANNEL

DESCRIPTION

The present invention relates to a transmission system for sending two signals simultaneously on the same channel.

In mobile radio applications speech in the band 300 Hz to 3.3 Hz is frequently transmitted as an FM signal on an allocated channel having a bandwidth of 25 kz. If it is desired to send data then this is frequently done by frequency shift key signalling. If the mobile is only allocated one channel then up to now only speech or data can be sent at any one time. However there is a desire to be able to present text information in a mobile as well as being able to conduct voice communications. However this would normally require two channels if done simultaneously.

One technique for sequentially sending text information on the same channel as current information is teletext in which as known the text information is transmitted in the spare unused lines of a television transmission. However there are applications where there are not regularly occuring unused slots in the signals as transmitted.

U.S. Pat. No. 4,672,605 discloses a method of simultaneously transmitting voice and data over a wide bandwidth (120 KHz) channel which may comprise a cable pair. The voice transmissions occupy the lower part of the channel bandwidth, say 0 to 3 KHz, and the data transmissions occupy the 30 KHz to 120 KHz part of the channel. The data is encoded and "whitened" using spread spectrum techniques. This method which is sometimes referred to as the one plus one technique is unsuitable for use on narrow band channels of say 25 KHz bandwidth.

According to one aspect of the present invention there is provided a method of transmitting first and second signals by the same transmitter on a single channel, comprising multiplying signals from a first signal source with a pseudo-random code to produce a spread spectrum signal, producing a modulated second signal, combining the spread spectrum signal and the modulated signal so that the modulated second signal lies within the bandwidth occupied by the spread spectrum signal and transmitting the combined signals on a single communications channel.

Spread spectrum signalling techniques are known per se but as far as is known the simultaneous transmission of two signals, such as a data signal and a voice signal, on the same channel has not been suggested before. By sending data using a spread spectrum technique in combination with the modulated signal a more effective use is made of the available signalling spectrum. Synchronisation of the pseudo-random code at the receiver may be achieved by the modulated signal including a code synchronisation signal. The data rate for the spread spectrum signal is typically between 10 and 100 b/s.

In order to be able to distinguish between the spread spectrum and modulated signals at the receiver, the spread spectrum signal is transmitted at a lower amplitude, for example 20 dBs lower, than the modulated signal and appears as noise in the transmitted signal.

When transmitting text, each page of data may be encoded using a different orthogonal pseudo-random code and transmitted simultaneously with the other pages. However, as only limited numbers of orthogonal codes are available then the system capacity is in consequence limited to a few tens of pages.

If the data to be transmitted is to be secure then it can be encrypted and further protected by changing the pseudo random code. In any event the data is not discernable to a person equipped with for example an FM receiver because the data as transmitted appears as noise. Additional security can be provided by using frequency hopping techniques.

According to a second aspect of the present invention there is provided a method of receiving a signal transmitted in accordance with the one aspect of the present invention, the method comprising frequency down-converting the received signal to form an IF signal, applying the IF signal to a demodulator for recovering the second signal, multiplying the IF signal with the same pseudo-random code as was used to encode the data, in order to despread the signal and narrowband filtering the despread signal in order to recover the first signal.

Despreading the data signal to collapse it back to its original bandwidth has a processing gain which facilitates the recovery of the first and second signals.

According to a third aspect of the present invention there is provided a transmitting apparatus comprising a multiplier having a first input connected to a source of first signals, a second input connected to a source of a pseudo-random code and an output for a spread spectrum first signal, means for producing a modulated second signal, and means for combining the spread spectrum first signal and the modulated second signal so that the modulated second signal lies within the bandwidth occupied by the spread spectrum signal and for transmitting the combined signals on a single communications channel.

According to a fourth aspect of the present invention there is provided a receiving apparatus for recovering a signal transmitted in accordance with the present invention, the apparatus comprising an r.f. front end for producing an IF signal comprising a spread spectrum first signal and a modulated second signal, means for demodulating the IF signal, a multiplier having a first input for receiving the IF signal, a second input coupled to a source of the same pseudo-random code as was used to spread the spectrum of the first signal and an output for the despread signal, and narrowband filtering means for selecting the first signal coupled to the multiplier output.

Figure 2:
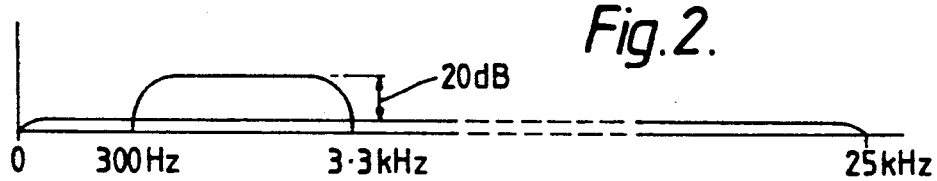
Figure 3:
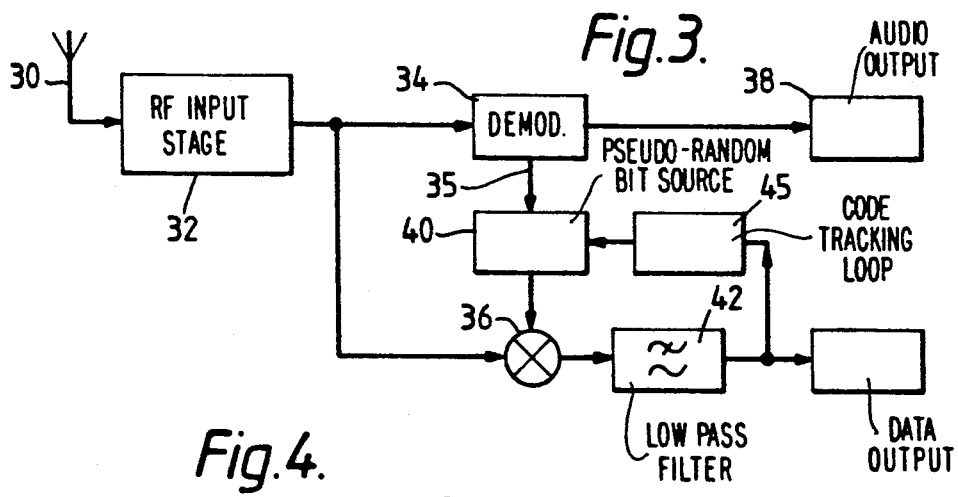
Figure 4:
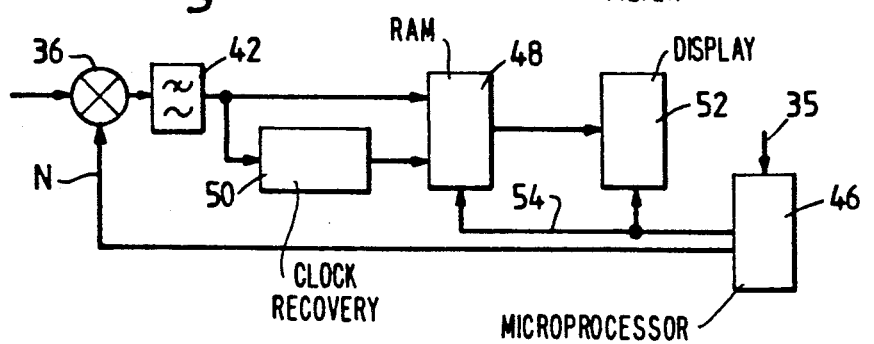

The present invention will now be described, by way of example, with reference to the accompanying drawings, wherein:

FIG. 1 is a block schematic diagram of a transmitter suitable for carrying out the method in accordance with the present invention, FIG. 2 illustrates the frequency spectrum of the spread spectrum data signal and an FM voice signal, FIG. 3 is a block schematic diagram of a receiver suitable for receiving the signal transmitted by the method in accordance with the present invention, and FIG. 4 illustrates a modification to the receiver in order to make it suitable for handling text data signals.

In the drawings the same reference numerals have been used to indicate corresponding features.

For simplicity of description it will be assumed that a 100 b/s ASCII encoded data signal will comprise the spread spectrum signal and the modulated signal is a frequency modulated speech signal. However the modulated signal may comprise a data signal having a bit rate of the order of 2.4 kbits/second or an AM, DSB-SC or SSB speech signal.

In FIG. 1 the speech signal having a bandwidth of the order of 3 kHz is derived from a source 10 which may be a microphone and amplifier. The data is derived from a source 12 which may comprise a message data source, a control information source or a source of text data. The speech signal from the source 10 is applied to a frequency modulator 14 which modulates the signal on an appropriate carrier frequency associated with a designated radio channel having 25 kHz bandwidth (see FIG. 2). The data signal is applied to a digital multiplier 16 in which it is multiplied by a pseudo-random code derived from a pseudo random bit sequence source 18 on a line 20 to form a spread spectrum signal extending across the entire channel bandwidth (FIG. 2). The amplitude of the spread spectrum signal is of the order of 20 dB less than that of the FM signal. The source 18 may also produce a synchronising signal on a line 22 which is connected to the frequency modulator 14 so that the FM signal may also include the synchronising signal. The FM signal and the spread spectrum signal are applied to an r.f. output stage 24 for transmission by way of an antenna 26. The FM signal lies within the bandwidth of the 25 KHz channel occupied by the spread spectrum signal which appears as noise in the signal as transmitted.

Referring to FIG. 3, a receiver comprises an r.f. front end 32 connected to an antenna 30. An IF signal derived from the r.f. front end 32 is applied to both an FM demodulator 34 and to a multiplier 36. In the FM demodulator 34 the speech is recovered and a synchronising signal may be obtained. The speech signal is passed to an audio output stage 38 for reproduction and/or storage. The synchronising signal, if present, is relayed on a line 35 to a pseudo random bit sequence source 40 which is arranged to produce an identical pseudo-random code as used to spread the spectrum of the data signal at the transmitter and in exact phase synchronisation with that code. Synchronisation is maintained by a code tracking loop 45 connected between the output of a low pass filter 42 and the pseudo-random bit sequence source 40. In the event of a synchronising signal not being transmitted then synchronisation at the receiver can be performed by for example a synchronous preamble or sliding correlator disclosed for example in "Spread Spectrum Systems" Second Edition by Robert C. Dixon, published by Wiley Interscience. The IF signal is multiplied with the synchronous pseudo-random signal to despread the signal. The low pass filter 42 which is connected to the output of the multiplier 36 selects the 100 b/s data signal which is passed to a suitable data output device 44 which includes clock recovery.

Despreading the whole of the IF signal enables one to obtain a processing gain irrespective of whether or not there is a second signal present, which processing gain facilitates the recovery of the data. For example if 100 b/s is spread over 25 kHz a processing gain of the order of 27 dB is achieved. In the case of speech having been frequency modulated, the processing gain obtained during the demodulation reduces the noise component due to the spread spectrum signal.

If it is desired to protect the data signal further the pseudo-random code can be changed regularly or at irregular intervals and the synchronisation signal could provide an indication that the code has been changed to another one in a preset sequence or provide an indication of the new code. An additional method for providing security to the whole transmission is frequency hopping.

In the case of the data being a number of pages of text then each page can have a unique orthogonal pseudo-random code and the synchronising signal could contain an indication of the page being transmitted so that at the receiver the appropriate orthogonal code can be used to despread the signal. If desired all the pages could be transmitted simultaneously and a predetermined page despread by applying the appropriate pseudo-random code.

FIG. 4 is a block schematic diagram of part of a receiver for recovering text data. In view of the fact that individual pages may be updated at different times, the orthogonal pseudo-random codes are stored in a microprocessor 46 which may in response to an appropriate indication in the synchronising signal on the line 35 produce the relevant code N. This code N is used, as in FIG. 3, to despread or operate on the entire signal from the IF front end 32 (FIG. 3). The output from the multiplier 36 is passed to a low pass filter 42 to recover the data signal which is stored in a RAM 48 under the control of the microprocessor 46. A clock recovery stage 50 is coupled to the output of the filter 42 and recovered clock signals are applied to the RAM 48 to synchronise the data being stored. A text display device 52 is connected to the RAM 48 for displaying pages of text which have been requested by way of a control bus 54 connected to the microprocessor 46.

An amplitude difference of the order of 20 dB between the FM and spread spectrum signals is considered desirable in order to minimise degradation of the FM signal. However the amplitude of the spread spectrum signal itself should be sufficiently large to enable the receiver to recover the data signal. In the event of having FM and spread spectrum signals of equal powers, then at the receiver one would recover a good data signal but a degraded speech signal.

We claim:

1. A method of transmitting first and second signals by the same transmitter on a single channel, comprising:
   multiplying signals from a first signal source with a pseudo-random code to produce a spread spectrum signal,
   producing a modulated second signal which is not a spread spectrum signal and which includes a synchronization signal for the pseudo-random code and other information,
   combining the spread spectrum signal and the modulated signal so that the modulated second signal lies within the bandwidth occupied by the spread spectrum signal, and
   transmitting the combined signals on a single communications channel.

2. A method as claimed in claim 1, in which the spread spectrum signal as transmitted is of lower amplitude than the modulated signal.

3. A method as claimed in claim 2, in which the amplitude of the spread spectrum signal is substantially 20 dB lower than the amplitude of the modulated signal.

4. A method as claimed in any one of claim 1, in which the signal from the first signal source comprises data having a bit rate of substantially 100 b/s.

5. A method as claimed in claim 4, wherein when the data comprises pages of text, each page having a different pseudo-random code.

6. A method as claimed in claim 5, wherein at least two pages of text are transmitted simultaneously.

7. A method as claimed in claim 4, wherein the data is encrypted by changing the pseudo-random code.

8. A method as claimed in any one of claim 1, wherein the modulated second signal comprises a speech signal.

9. A method as claimed in claim 8, wherein the speech signal is frequency modulated.

10. A method as claimed in any one of claim 1, in which the signal is transmitted using frequency hopping techniques.

11. A method of receiving a signal transmitted in accordance with the method as claimed in claim 1, comprising frequency down-converting the received signal to form an IF signal, applying the IF signal to a demodulator for recovering the second signal, multiplying the IF signal with the same pseudo-random code as was used to encode the data, in order to despread the signal and narrowband filtering the despread signal in order to recover the first signal.

12. A receiving apparatus for use with a method as claimed in claim 1, comprising an r.f. front end for producing an IF signal comprising a spread spectrum first signal and a modulated second signal, means for demodulating the IF signal, a multiplier having a first input for receiving the IF signal, a second input coupled to a source of the same pseudo-random code as was used to spread the spectrum of the first signal and an output for the despread signal, and narrowband filtering means for selecting the first signal coupled to the multiplier output.

13. An apparatus as claimed in claim 12, in which the demodulating means comprises means for deriving a synchronising signal from the modulated second signal and the pseudo-random code source has a synchronising signal input connected to the demodulating means.

14. An apparatus as claimed in claim 13, in which the pseudo-random code source comprises processing means containing a plurality of orthogonal pseudo-random codes, the processing means being responsive to a code identifier contained in the synchronising signal to provide an appropriate code to the multiplier.

15. A transmitting apparatus comprising a multiplier having a first input connected to a source of first signals; a second input connected to a source of a pseudo-random code and an output for a spread spectrum first signal; means for producing a modulated second signal which is not a spread spectrum signal, and which includes a synchronization signal for said pseudo-random code and other information; and means for combining the spread spectrum first signal and the modulated second signal so that the modulated second signal lies within the bandwidth occupied by the spread spectrum signal and for transmitting the combined signals on a single communications channel.

16. An apparatus as claimed in claim 15, in which the pseudo-random code source has a synchronising output coupled to the means for producing a modulated signal.

17. An apparatus as claimed in claim 15 or 16, in which the means for producing a modulated signal comprises a frequency modulator.

* * * * *